(No Model.)
M. T. HENSON.
VISE.
No. 493,625. Patented Mar. 14, 1893.
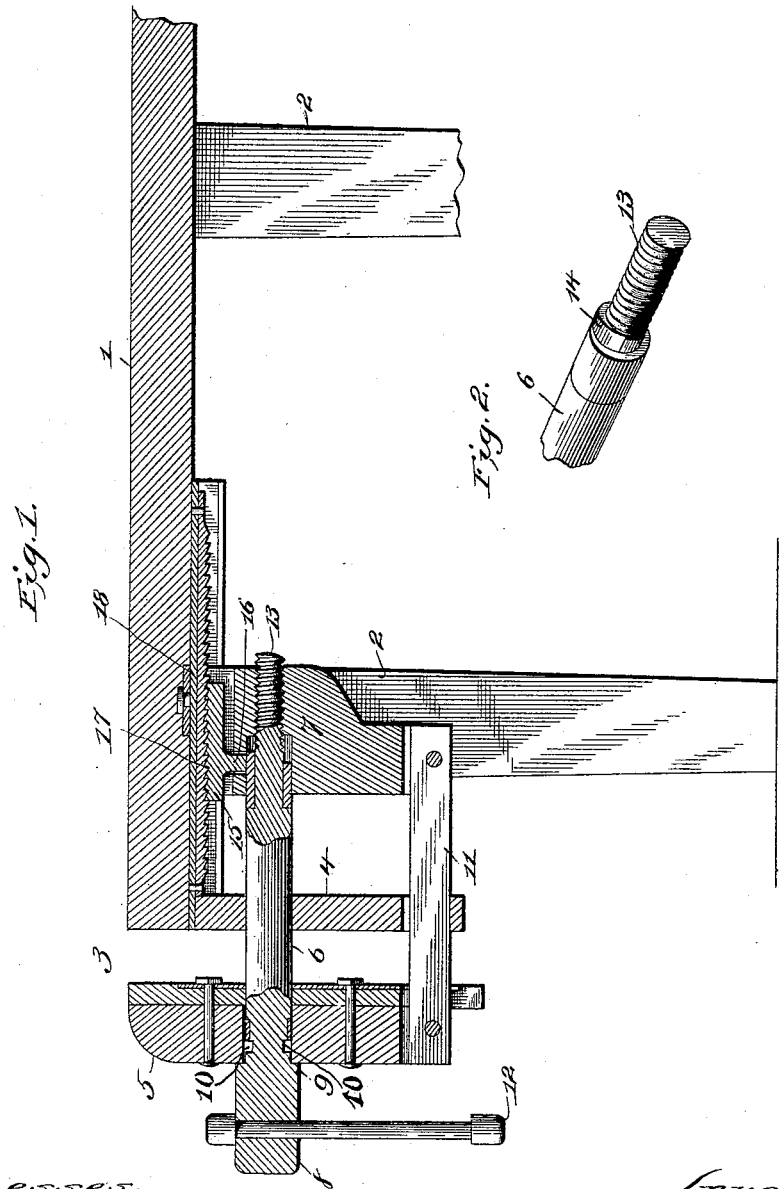
Witnesses.
Harry T. Rohrer.
George S. Cruse.
Inventor:
Marvin T. Henson
By Knight Bros.
Attorneys

UNITED STATES PATENT OFFICE.

MARVIN T. HENSON, OF SIDNEY, OHIO, ASSIGNOR TO BENJAMIN GILLESPIE AND JOHN W. MACY, OF SAME PLACE.

VISE.

SPECIFICATION forming part of Letters Patent No. 493,625, dated March 14, 1893.

Application filed November 11, 1892. Serial No. 451,646. (No model.)

*To all whom it may concern:*

Be it known that I, MARVIN T. HENSON, a citizen of the United States, residing at Sidney, Shelby county, Ohio, have invented a new and useful Improvement in Adjustable Vises, of which the following is a specification.

My present invention relates to a bench-vise embodying the same general features as my patent No. 266,477, granted October 24, 1882, according to which the nut is mounted to slide beneath the bench and is held by a pawl and ratchet, which may be disengaged at will for quickly adjusting the jaws to any width, after which the gripping is effected by a screw in the usual way.

My present invention has for its object to control the engagement and disengagement of the pawl and ratchet by means of the gripping screw, in a particular manner, and it consists in the particular construction of the screw whereby the above object is attained in a more convenient manner and the vise rendered more effective, as will be hereinafter more fully described and particularly pointed out in the claim.

In the accompanying drawings:—Figure 1 is a longitudinal section through a bench and vise having my improvement applied thereto. Fig. 2 is a perspective view of the threaded end of the screw, the rear portion of which terminates is a spiral cam, for raising the pawl into engagement with the ratchet.

1 represents the bench which is supported on suitable legs 2, and 3 represents the vise which is applied to said bench. The vise consists of the stationary jaw 4, the moving jaw 5, the screw 6 and the nut 7. The screw has the usual head 8 provided with shoulder 9, for forcing the moving jaw inward and is secured in the movable jaw for moving it outward by means of the usual keys 10 which enter an annular groove in the screw. Aside from being connected with the nut 7 and adjustable relatively thereto to a limited extent by means of the screw 6, the movable jaw is also connected with said nut 7 by means of a bar 11 pivoted to the jaw and to said nut in such a manner that while the jaw is permitted to grip an object by relative movement of its upper end, it is also connected with the nut to move the same through the medium of the screw 6 and bar 11 when the nut is disengaged in the manner to be hereinafter described.

The screw threaded portion 13 of the screw 6 terminates at its front end in a spiral cam 14 which commences at the periphery of the screw thread and runs up spirally to the periphery of the larger portion of the screw. In the upper part of the nut is mounted a dog 15 which is supported through the medium of a downward extension 16 upon the screw 6. This dog, as will appear, is supported at different heights accordingly as it rests upon the large diameter of the screw 6 or upon the reduced threaded portion 13 of said screw. When it rests upon the enlarged portion of the screw its upper serrated face 17 engages with a correspondingly serrated, but elongated plate 18. When the dog rests upon the reduced portion 13 of said screw, it is out of engagement with said plate 18. Inasmuch as the dog is fixed against longitudinal movement relatively to the nut, it is obvious that the nut is locked or permitted to move accordingly as the dog is in or out of engagement with the plate. So much of the invention I do not claim as broadly new inasmuch as the principles involved have heretofore been embodied in devices of other constructions. The principal object, however of my present invention is to afford means whereby a greater range of movement may be obtained for the movable jaw by shifting the screw before and after the nut is locked. For this purpose the screw is adapted to travel some distance beneath the dog after it has become engaged, for tightening the vise, and also some distance while the dog rests upon the reduced portion of the screw and after the dog has been released. At the same time the form of cam is such that the dog readily rides up as the screw passes beneath it from the reduced to the enlarged portions. Should the dog be resting upon the threaded portion some distance from the cam, it is only necessary to turn the screw a few times, during which time the nut is drawn along until the dog engages after which the gripping effect takes place.

In the foregoing it will be seen that a greater range of motion is afforded in my construction of device than in those heretofore constructed both before and after gripping, which is found very convenient in use.

Having thus described my invention, what I claim is—

In a vise the combination of the fixed jaw having a ratchet plate fixed relatively thereto, a movable jaw, a screw attached to the movable jaw and extending beyond the fixed jaw, a nut mounted to slide relatively to the fixed jaw and threaded to receive the end of the screw, and a dog movable vertically in the nut and having serrations for engagement with the fixed plate; the end of the screw being provided with the enlarged and reduced portions upon each of which the dog may rest while the screw moves a distance relatively to said dog, and a spiral cam between the enlarged and reduced portions of the screw and upon which the dog may rest while passing from one portion of the screw to the other; substantially as herein described.

MARVIN T. HENSON.

Witnesses:
JOHN SULLIVAN,
O. HANCOCK.